SLOW MOTION PICTURE VIDEO SYSTEM WITH MAGNETIC DISC STORAGE

Filed Aug. 3, 1967 5 Sheets-Sheet 1

INVENTOR.
JOHN T. PHAN
BY Robert Mednick
ATTORNEY

INVENTOR.
JOHN T. PHAN
BY Robert Mednick
ATTORNEY

SLOW MOTION PICTURE VIDEO SYSTEM WITH MAGNETIC DISC STORAGE

Filed Aug. 3, 1967

INVENTOR.
JOHN T. PHAN

BY Robert Mednick

ATTORNEY

SLOW MOTION PICTURE VIDEO SYSTEM WITH MAGNETIC DISC STORAGE

Filed Aug. 3, 1967 5 Sheets-Sheet 4

INVENTOR.
JOHN T. PHAN
BY Robert Mednick
ATTORNEY

SLOW MOTION PICTURE VIDEO SYSTEM WITH MAGNETIC DISC STORAGE

Filed Aug. 3, 1967 5 Sheets-Sheet 5

INVENTOR.
JOHN T. PHAN
BY Robert Meduick
ATTORNEY

United States Patent Office 3,518,366
Patented June 30, 1970

3,518,366

SLOW MOTION PICTURE VIDEO SYSTEM WITH MAGNETIC DISC STORAGE

John T. Phan, Redwood City, Calif., assignor, by mesne assignments, to Data Memory, Inc., Mountain View, Calif., a corporation of California Filed Aug. 3, 1967, Ser. No. 658,253
Int. Cl. H04n 5/02, 5/78
U.S. Cl. 178—6.6 20 Claims

ABSTRACT OF THE DISCLOSURE

A slow motion picture video system including a periodic reproducer with a magnetic storage device for intermittently reproducing consecutive portions of a recorded moving picture video signal, a slow motion timer to determine the periodic rate at which the periodic reproducer reproduces the portions of the moving picture video signal, and a single picture reproducer to receive each of said portions of the moving picture video signal, and to form therefrom continuous frames of a still picture video signal during each of said periodic intervals, said still picture video signal having the same picture information in each field thereof and having the visual reproducing signals of the moving picture video signal, whereby the consecutively formed still picture video signals enable a slow motion video signal to be developed.

The present invention relates to a slow motion picture video system, and more particularly to a system for converting a moving picture video signal into a slow motion video signal that can be utilized in a television receiver for said moving picture video signal.

In addition to picture information, a standard teletelevision receiver. The horizontal and vertical sync pulses for timing the horizontal and vertical scanning rate in a television receiver. The horizontal and vertical sync pulses occur during scanning retrace periods, when the screen in the television receiver is blanked out and no picture information is present. The television signal has a series of sequential signal frames, each frame consisting of two fields. The horizontal sync pulses of alternate fields are displaced one-half horizontal line period to develop an interlacing scanning pattern. Equalizing pulses are provided during the vertical blanking periods to maintain the horizontal synchronization scanning rate in between alternate fields. When the television signal is applied to a television receiver, a series of separate pictures are rapidly reproduced to be viewed as a continuous and changing motion picture. Accordingly, in addition to picture information, a television signal includes visual reproducing signals. These visual reproducing signals are vertical and horizontal sync pulses, equalizing pulses, and horizontal and vertical blanking pulses. In order toenable the picture information to be viewed in a television receiver, these visual reproducing signals are combined with the picture information to form what is called a composite video signal.

This television or moving picture video signal may be applied to a storage device for recordation to enable it to be reproduced at a later time. Such a storage device may include a magnetic storage member and a transducer capable of either recording or reproducing such a signal from the storage member. When the video signal is prepared for recordation and applied to the transducer, the signal can be recorded on a track of the storage member scanned by the transducer. Subsequently, upon rescanning the same track at the same rate of speed, the transducer will reproduce the recorded signal to enable it to be restored to its original form. Since it is desirable to maintain the field or frame rate of the television signal, it will be realized that a slow motion picture signal cannot be developed by simply slowing down the scanning rate of the storage device during playback.

The present invention relates to a system for converting a moving picture video signal into a slow motion video signal that can be utilized in a television receiver for said moving picture video signal. The system of this invention includes a periodic reproducer which has a storage device capable of separately reproducing a predetermined portion of each consecutive frame of a recorded moving picture video signal at periodic intervals equal to an integer multiple of the frame rate. The system of this invention also includes a single picture reproducer for receiving each of said separately reproduced frame portions to form repetitive still picture signals therefrom for the duration of each of said periodic intervals. In other words, at periodic intervals, the system of this invention develops a series of still picture signals from a frame portion of a recorded moving picture signal, followed by another series of still picture signals developed from the next occurring frame portion of the recorded signal, and then followed by similar series of still picture signals from each consecutively occurring frame portion of the recorded moving picture signal, in order to form a continuous slow motion video signal.

It is, therefore, an object of this invention to provide a system for converting a moving picture video signal into a slow motion video signal.

Another object of this invention is to provide a system for converting an interlaced composite moving picture video signal into an interlaced composite slow motion video signal.

Still another object of this invention is to provide a system for developing a slow motion video signal from a composite moving picture video signal without disturbing or losing any of the synchronization signals thereof.

A further object of this invention is to provide a system for forming continuous still picture video signals from consecutive frames of a moving picture video signal in order to develop a slow motion video signal that can be viewed as a continuous picture on a television receiver.

A still further object of this invention is to provide a system for repetitively reproducing still picture video signals at selected intervals from consecutive frames of a moving picture video signal in order to form a continuous slow motion picture video signal.

Still a further object of this invention is to provide a system for converting a moving picture video signal into a slow motion video signal at a selected reduced speed of motion.

Another object of this invention is to provide a system for converting a moving picture video signal into a slow motion video signal at various slow motion rates.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

In the video or television field, the term "sync" for brevity purposes is often used for the word "synchronization," and this term "sync" is also so used therefor in this specification.

FIG. 1 is a simplified block diagram illustrating a video recording and reproducing apparatus incorporating the present invention.

FIG. 2*a* shows a portion of the waveform of a typical composite television signal, and shows the sync pulses during the vertical blanking intervals of one field of the television signal.

FIG. 2*b* is a view similar to FIG. 2*a*, but shows the sync pulses during the next occurring blanking interval for an alternate field of the television signal.

Figure 3:
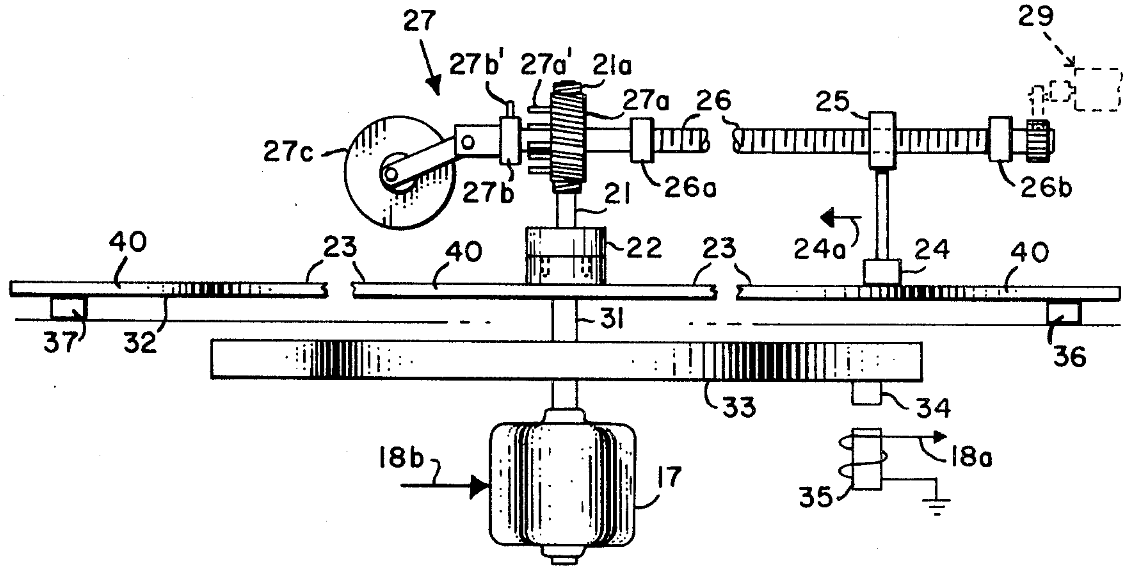
FIG. 3 is a side view of the combined storage device for the periodic reproducer and the signal repeater shown in block form in FIG. 1.
Figure 5A:
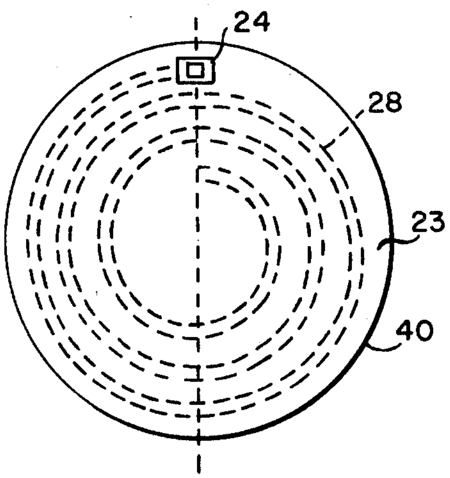

FIG. 5*a* is a top view of the storage member and the transducer unit of the periodic reproducer as seen along lines 5*a*—5*a* of FIG. 3.

Figure 5B:
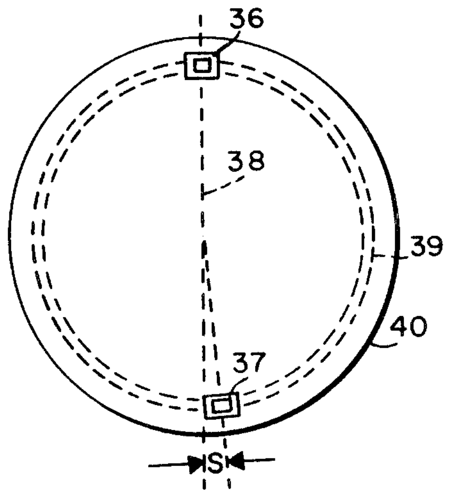

FIG. 5*b* is a bottom view of the storage member and the transducer units of the signal repeater as seen along lines 5*b*—5*b* of FIG. 3.

Figure 1:
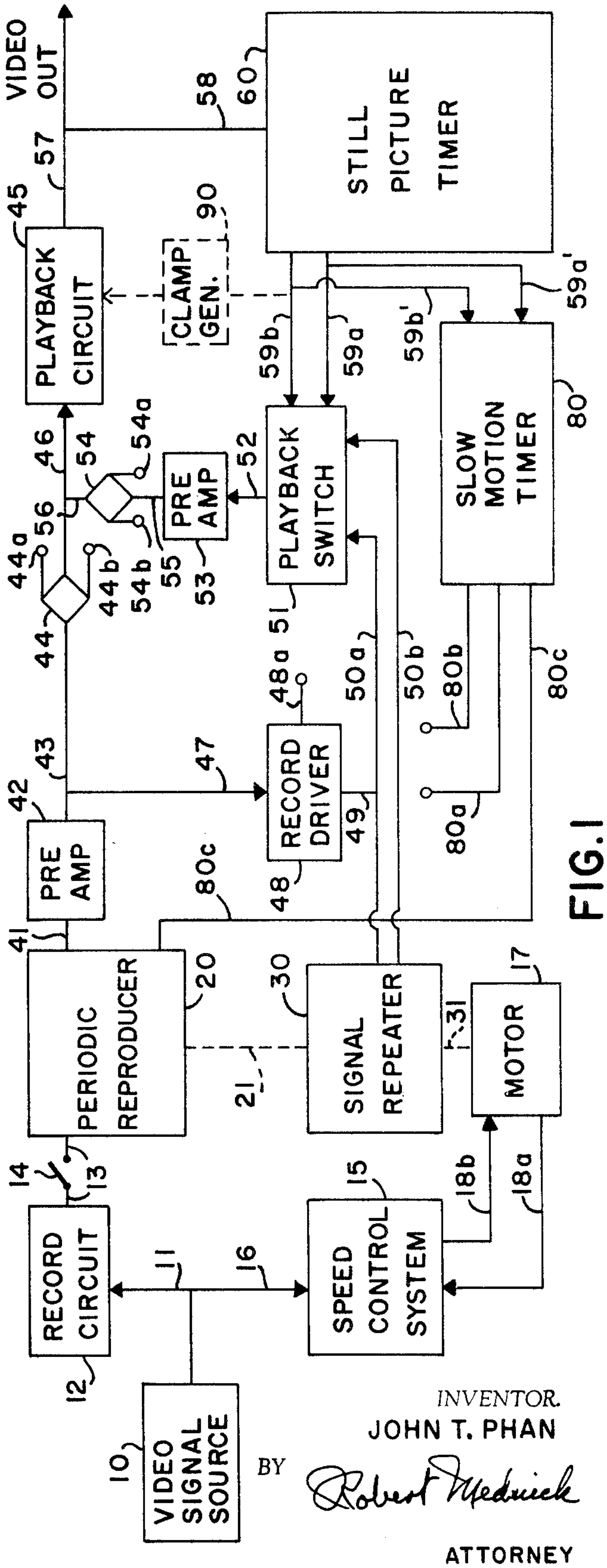
Figure 6:
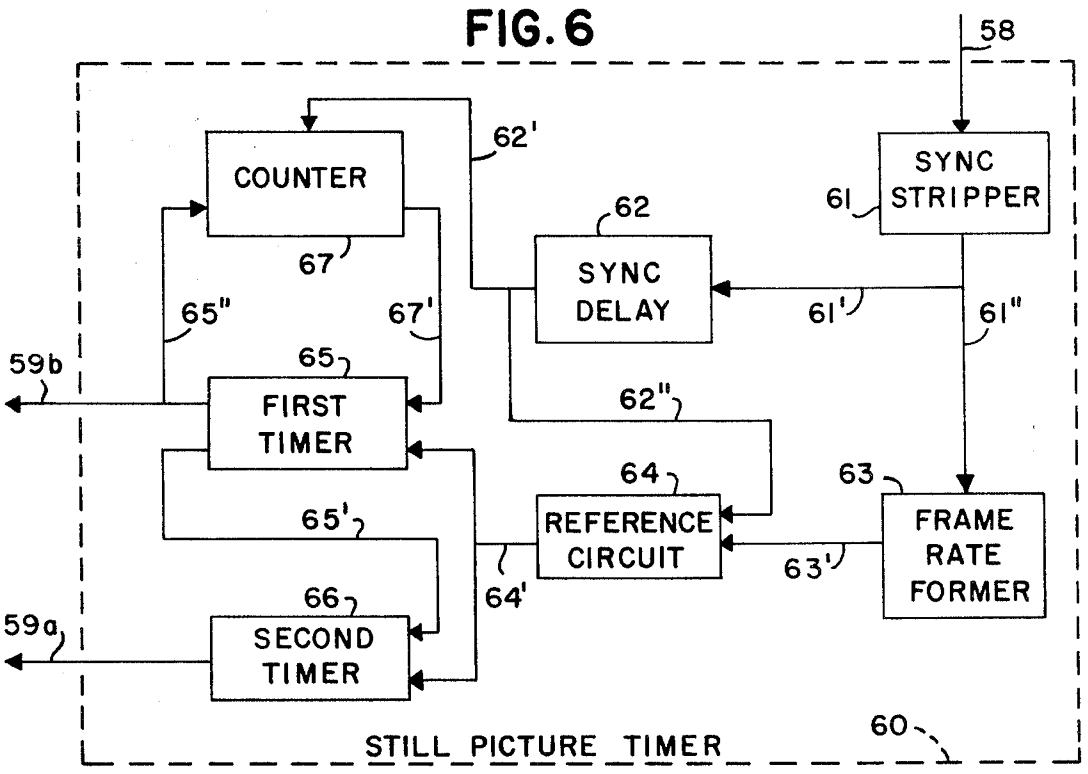

FIG. 6 is a detailed block diagram of the still picture timer shown in a simplified block form in FIG. 1.

Figure 7A:
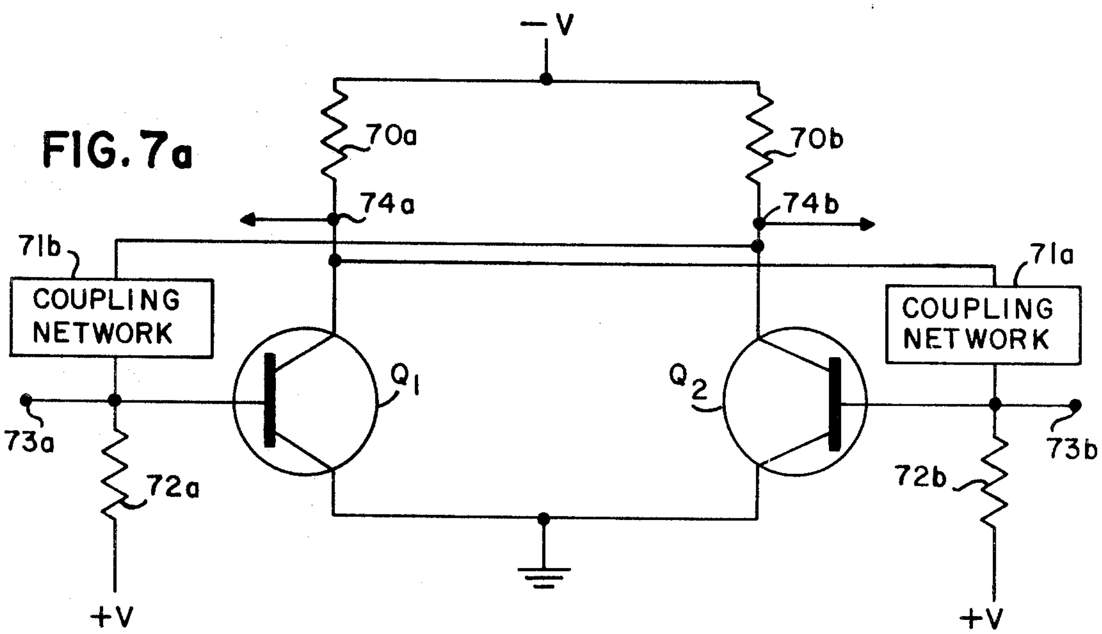

FIG. 7*a* shows a basic form of a multivibrator circuit.

Figure 7B:
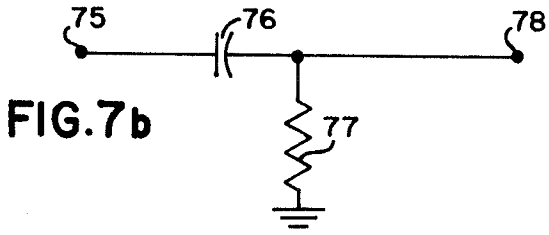

FIG. 7*b* shows a differentiator circuit that is used with the circuit of FIG. 7*a*.

Figure 8A:
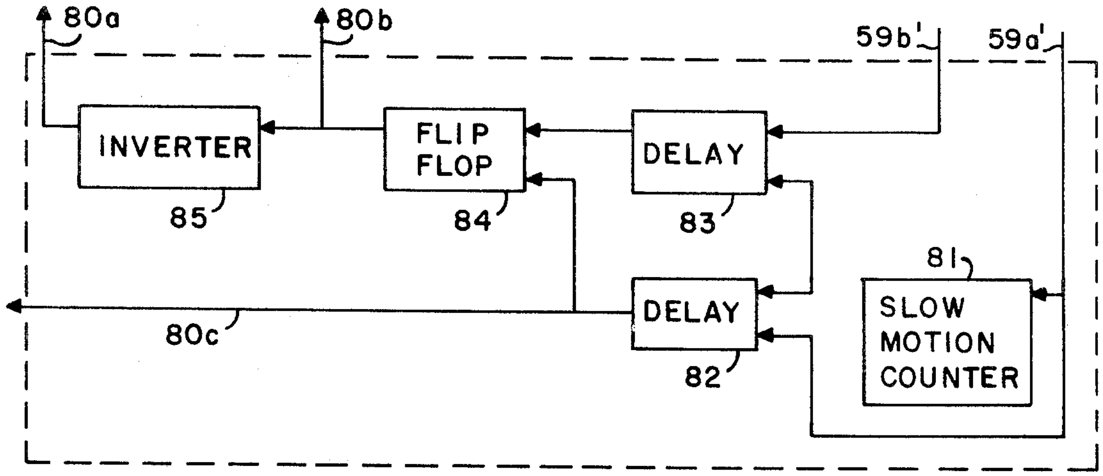

FIG. 8*a* is a detailed block diagram of the slow motion timer seen in FIG. 1.

Figure 8B:
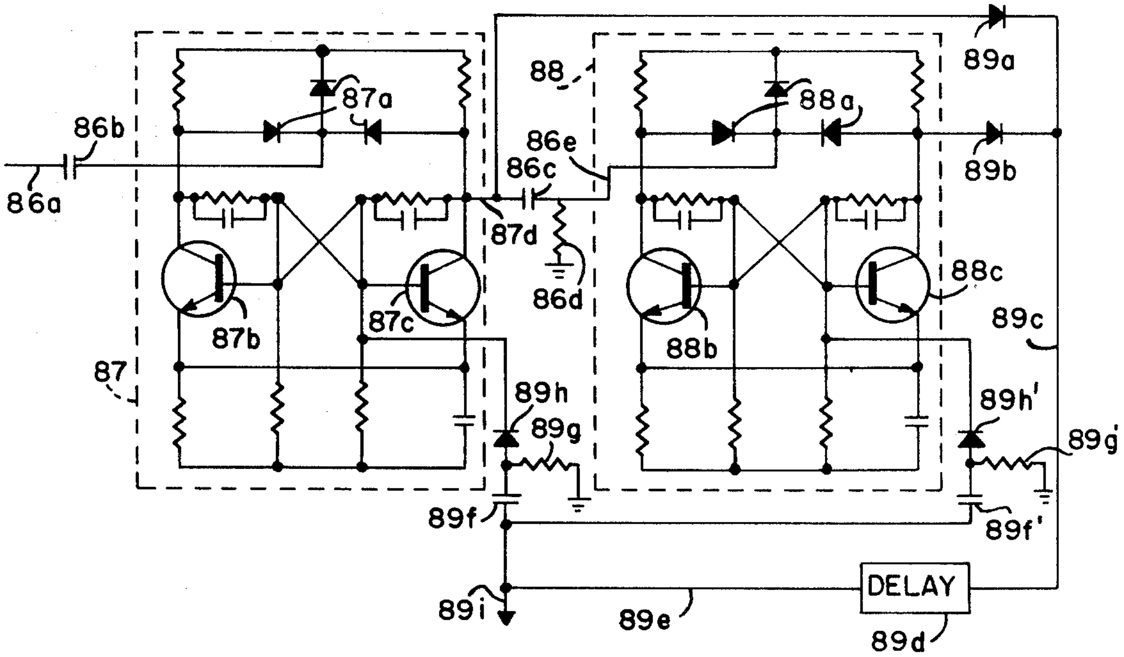

FIG. 8*b* is a schematic circuit diagram of a slow motion counter that may be used in the block diagram of FIG. 8*a*.

Figure 9:
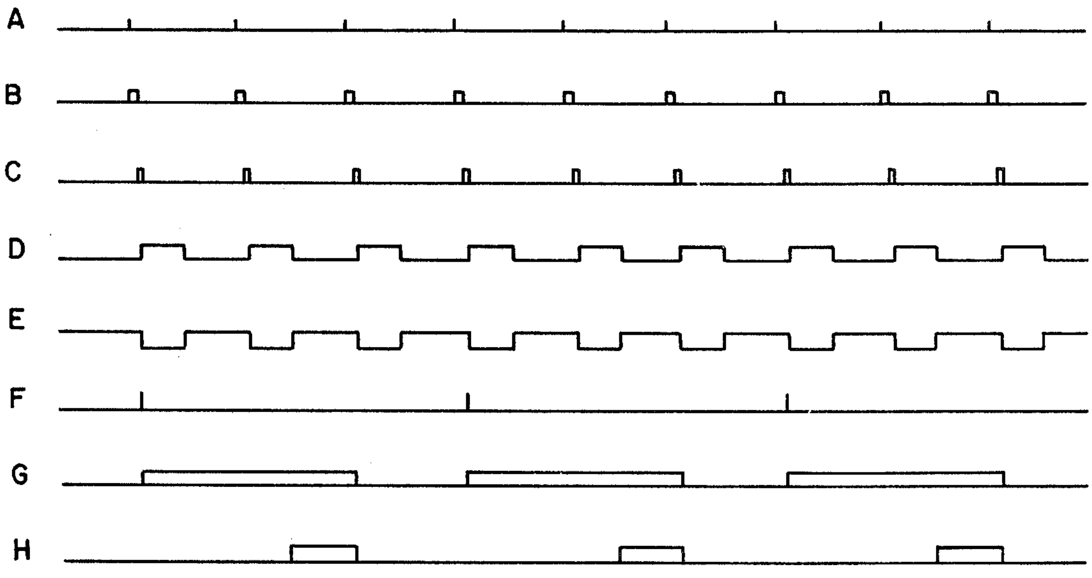

FIG. 9 is a graph showing several waveforms developed in the video recording and reproducing apparatus seen in FIG. 1, and illustrates their time relationships when developing a slow motion video signal from a moving picture video signal.

Referring now to the drawings, there is shown in FIG. 1 a block diagram of a video recording and reproducing apparatus, according to the present invention, for converting a moving picture video signal into a slow motion video signal. A moving picture video signal from video signal source 10 is applied through line 11 to record circuit 12, which is capable of amplifying, modulating, and otherwise preparing the moving picture video signal for recordation at periodic reproducer 20. The output from record circuit 12 is applied through line 13 and switch 14 (when closed) to periodic reproducer 20. A speed control system 15 is also shown connected to video signal source 10 by line 16. Speed control system 15 is connected to receive positioning pulses from motor 17 via line **18*a*, and to develop a control signal to be applied to motor 17 via line 18*b*. Speed control system 15 is capable of synchronizing the speed and phase alignment of motor 17** with the vertical sync signal of the moving picture video signal. A suitable speed control system is shown in a copending patent application of Kurt R. Machein and Uwe W. Reese, Ser. No. 257,483, filed Aug. 15, 1963, entitled "Phase Control System," now U.S. Pat. No. 3,277,-236 and assigned to the same assignee as this invention.

The reproduced signal from periodic reproducer 20 is applied by line 41 to pre-amplifier 42 for amplification thereof. Line 43 connects pre-amplifier 42 to bridge switch 44 which in turn is connected to playback circuit 45 by line 46. Line 47 connects pre-amplifier 42 to record driver 48 which in turn connects to signal repeater 30 via line 49. The reproduced signals from signal repeater 30 are applied by lines **50*a* and 50*b* to playback switch 51. Line 52 connects a playback switch 51 to pre-amplifier 53 which in turn is connected to bridge switch 54 by line 55. Bridge switch 54 connects to playback circuit 45 by lines 56 and 46**.

Periodic reproducer 20 can receive the moving picture video signal as prepared by record circuit 12, and record a part thereof (e.g. a 20 second duration of such signal) on a continuous spiral magnetic track therein, as described hereinafter. Thereafter periodic reproducer 20 is capable of reproducing consecutive portions of the moving picture video signal at a rate equal to an integer multiple of the field or frame rate of the moving picture signal. For instance, after a portion of a frame of the recorded moving picture video signal is reproduced, a similar portion of the following frame of the moving picture video signal may be reproduced at a selected interval later (e.g. either 1, 2, or 3, etc. frame intervals later). Then, another similar portion of the next occurring frame of the moving picture signal is reproduced at the same interval later. Thereafter, periodic reproducer 20 will continue to reproduce portions of consecutively following frames of the recorded moving picture signal. As a result, consecutive portions of the moving picture video signal are intermittently reproduced at this selected rate interval.

Signal repeater 30 can receive the portion of the moving picture signal reproduced from periodic reproducer 20 and record it. In addition, signal repeater 30 can repetitively reproduce the recorded portion of the moving picture signal at its field rate. The portion of the moving picture signal reproduced by signal repeater 30 will alternately appear on lines **50*a* and 50*b***, respectively, during every other video field interval.

A still picture timer 60 is provided to produce playback timing signals to operate playback switch 51 for combining the signals on lines **50*a* and 50*b* in order to form a still picture video signal therefrom. Still picture timer 60 receives the output video signal on line 57 from playback circuit 45 via line 58 and produces playback timing signals on lines 59*a* and 59*b* connected to playback switch 51. The timing signals on lines 59*a* and 59*b* are applied to slow motion timer 80 by lines 59*a'* and 59*b'*, respectively. Bridge switch operating pulses are developed on output lines 80*a* and 80*b* of slow motion timer 80, and actuating pulses are developed on output line 80*c* of slow motion timer 80. Although not shown in FIG. 1, line 80*a* connects to both line 44*a* of switch 44 and to line 54*a* of switch 54 as well as to line 48*a* of record driver 48, and line 80*b* connects to both line 44*b* of switch 44 and to line 54*b* of switch 54. In addition, output line 80*c* of slow motion timer 80 connects to periodic reproducer 20**.

Figures 2A, 2B:
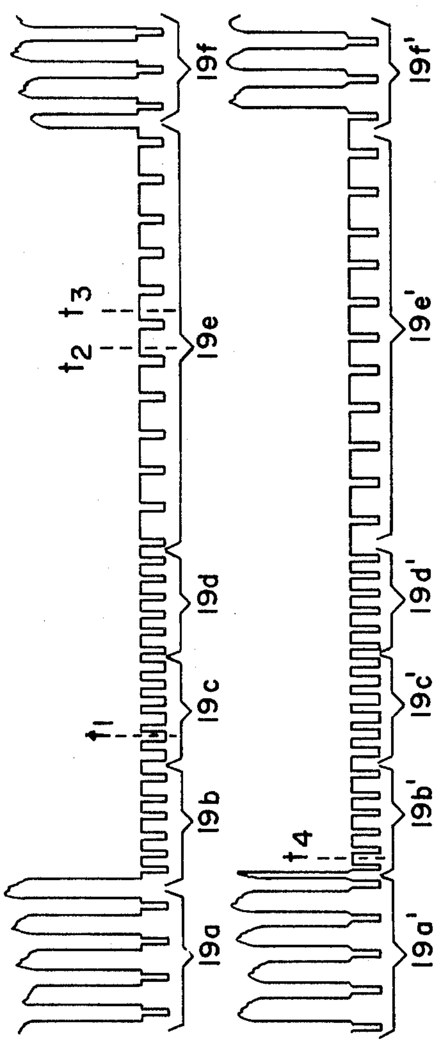

Video signal source 10 of FIG. 1 may be any composite television or video signal source that provides a moving picture video signal in accordance with the standards of television broadcasting. This multiple composite video signal includes visual reproducing signals, such as horizontal and vertical blanking and synchronization pulses, in addition to picture information signals. In FIGS. 2*a* and 2*b*, portions of the waveform of such a typical television signal are shown. FIG. 2*a* shows the last few lines **19*a* of a picture information signal, followed by six equalizing pulses 19*b*, a serrated vertical sync pulse 19*c*, another six equalizing pulses 19*d*, several horizontal sync pulses 19*e*, and then by several lines 19*f*** of the picture signal in the next occurring television field. FIG. 2*b* shows a similar portion of the consecutively occurring field of the television signal. As is well known, the picture information signals of alternate fields are displaced at half horizontal line intervals to produce interlacing pictures in the television receiver.

Referring now to FIG. 3, there is seen a side view of the combined storage device of periodic reproducer 20 and signal repeater 30, shown in block form in FIG. 1. Electric motor 17 is connected by drive shaft 31 to rotate storage member 40, which also rotates drive shaft 21 connected to storage member 40 by mechanical coupler 22. Drive shaft 21 rotates a gear **21*a* secured at its end extending above storage member 40. Storage member 40 is an aluminum disc having magnetic material deposited both on top surface 23 and bottom surface 32 thereof. A flywheel 33 is seen connected to turn with drive shaft 31 and has a small magnet 34 secured to its underside as seen in FIG. 3. A pick up coil 35 is fixedly positioned near magnet 34 to have a pulse induced therein during each cycle of rotation of drive shaft 31 when magnet 34 passes by coil 35. As storage member or disc 40 is rotated by motor 17, during each revolution thereof, a positioning pulse is induced in coil 35 and appears on line 18***a*. In speed control system 15, the vertical sync signal derived from video signal source 10 is compared with the positioning pulse on line 18*a* in order to develop a control signal to control the rotational speed and phase alignment of motor 17. This control signal from speed servo system 15 is applied by line 18*b* to motor 17 to cause it to rotate in accordance with the frame rate of the moving picture video signal.

Periodic reproducer 20 also includes a transducer unit 24 with a magnetic head for contacting the top magnetic surface 23 of disc 40. The magnetic head of transducer unit 24 is capable of either recording a video signal on top surface 23, or reproducing a recorded signal therefrom. An example of such a transducer unit is shown in copending patent application of Rober Fred Pfost and Walter Earl Lock, Ser. No. 431,083, filed Feb. 8, 1965, now U.S. Pat. No. 3,397,289, entitled "A Magnetic Transducer Head Device," and assigned to the same assignee as this invention. Transducer unit 24 is connected to receive via line 13 the output signal of record circuit 12 through switch 14, when closed, to record a video signal on top surface 23 of disc 40. In addition, transducer unit 24 is connected by line 41 to apply thereto its reproduced video signal.

Figure 4:
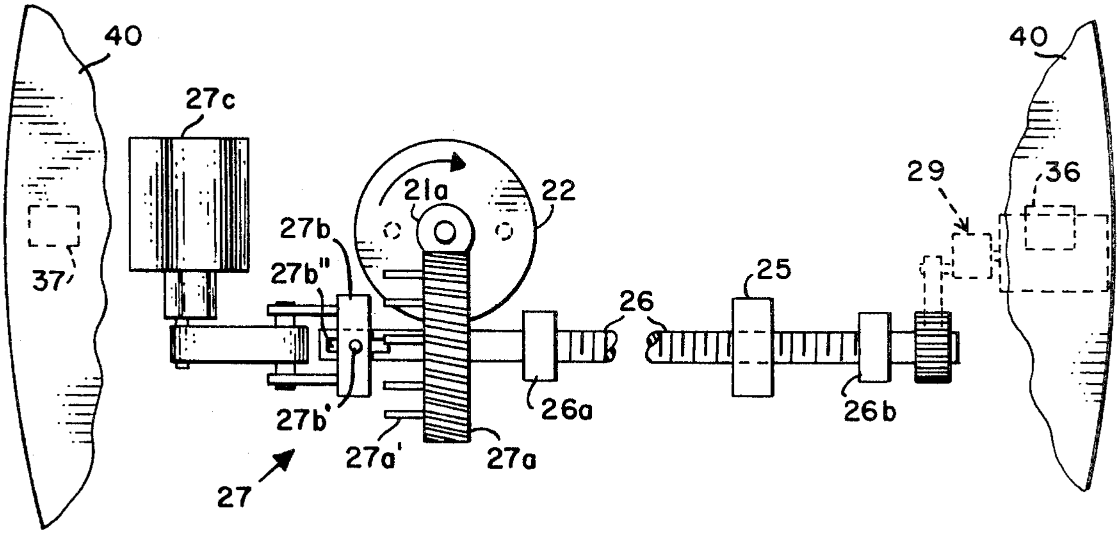
FIG. 4 is an enlarged top view of the storage device for the periodic reproducer as seen along lines 4—4 of FIG. 3.

As also seen in FIG. 4, transducer unit 24 is attached to a screw follower 25 which has a threaded bore to engage a similarly threaded rod 26. Mechanical guides (not shown) are also provided to prevent transducer unit 24 and screw follower 25 from turning, while allowing them to move linearly across disc 40. Rod 26 is journalled in fixed bearing supports 26*a* and 26*b* to allow rod 26 to rotate. When rod 26 is rotated, screw follower 25 acts as a non-rotating nut moving along an inner screw (i.e. threaded rod 26). As a result, when rod 26 is rotated, transducer unit 24 will linearly move across disc 40 in the direction of the longitudinal axis of rod 26 as indicated by arrow 24*a*.

In periodic reproducer 20, clutch means 27 is provided to intermittently rotate rod 26 while drive shaft 21 is rotating. Clutch means 27 includes a driver member 27*a*, a driven member 27*b*, and an actuator 27*c*. Driver member 27*a* is journalled on rod 26 to freely rotate thereon. As shaft 21 rotates, its attached gear 21*a*, being threadab lyengaged with the threads on the outer rim of driver-member 27*a*, will cause driver member 27*a* to rotate in a transverse direction. The threads of gear 21*a* and driver member 27*a* are designed so that driver member 27*a* will rotate at one-tenth of the speed of shaft 21. With shaft 21 rotating at 30 cycles per second (i.e. the frame rate of the video signal), then driver member 27*a* will rotate at three cycles per second. Driver member 27*a* is also seen to have five fixed pins 27*a'* extending from one side thereof towards driven member 27, said pins 27*a'* being equally positioned on a circle on said side.

Driven member 27*b* of clutch means 27 is connected to the end of rod 26 so that when driven member 27*b* is turned, rod 26 will also be turned therewith. Driven member 27*b* has one pin 27*b'* extending therefrom. Driven member 27*b* can slide on the end of rod 26 along slot 27*b''* in rod 26 in order to move toward or away from driver member 27*a*. When driven member 27*b* is moved toward driver member 27*a*, its pin 27*b'* will move in between two of the pins 27*a'* of driver member 27*a*. In that event, with driver member 27*a* rotating, one of its pins 27*a'* will shortly thereafter engage pin 27*b'* of driven member 27*b* and thereby rotate driven member 27*b* and rod 26. When driven member 27*b* is moved away from driver member 27*a*, pin 27*b'* of driven member 27*b* will not engage any of the pins 27*a'* of driver member 27*a*. In that event, rod 26 will not be rotated.

Actuator 27*c* of clutch means 27 is illustrated in the form of a stepping motor. This stepping motor is connected to driven member 27*b* so that the rotational movement of the stepping motor will impart a reciprocating translational movement to driven member 27*b*. Actuator 27*c* may be any suitable device, when energized, is capable of imparting a small linear movement in a short period of time; and when not energized, will return to its original position. For example, actuator 27*c* may be a magnetically operated relay with a short stroke and with a suitably fast response characteristics. When actuating pulses are present on line 80*c* from slow motion timer 80, actuator 27*c* is to be energized to slide driven member 27*b* towards driver member 27*a*. Then, pin 27*b'* of driven member 27*b* will shortly thereafter engage one of the pins 27*a'* of driver member 27*a* in order to rotate rod 26. When an actuating pulse is not present on line 80*c* from slow motion timer 80, actuator 27*c* will not be energized, and driven member 27*b* will move away from driver member 27*a* so that rod 26 will not rotate.

If actuator 27*c* is continuously energized, rotating drive shaft 21 will continuously rotate rod 26, then transducer unit 24 will linearly move along rod 26 and its magnetic head will trace a continuous spiral track on top surface 23 of disc 40. FIG. 5*a* is a top view of the storage device of periodic reproducer 20 as seen in FIG. 3, in which this continuous spiral track 28 is seen in dotted lines. With switch 14 closed, then the magnetic head of transducer unit 24 will record the moving picture video signal derived from video signal source 10 on this spiral track 28. Since motor 17 rotates disc 40 at the frame rate of the video signal, or at 30 cycles per second, then each frame of the video signal will be recorded during each revolution of disc 40.

With clutch actuator 27*c* capable of responding within a two frame period of time to enable driven member 27*b* to be engaged by (or disengaged from) driver member 27*a* as above described, pins 27*a'* on driver member 27*a* are spaced to be two video frame intervals apart. It is desired that the lateral distance between the adjoining curves of spiral track 28 should be close enough to utilize as much of magnetic surface 23 of disc 40 as possible without interference from adjoining track portions. For these reasons, it is convenient to have threaded rod 26 rotate at one-tenth the speed of drive shaft 21, and to provide five pins 27*a'* on driver member 27*a* as described in this specification.

After spiral track 28 is recorded, transducer unit 24 is returned to its starting position in order to be able to reproduce consecutive portions of the recorded video signal on spiral track 28. Slow motion timer 80 develops a slow motion rate signal which is used to form actuating pulses to enable actuator 27*c* to cause clutch means 27 to be engaged or disengaged. Although clutch means 27 is disengaged from time to time, it will be realized that magnetic head of transducer unit 24 will always follow spiral track 28 whenever clutch means 27 is engaged. It will also be realized that the reproduced portion of the recorded moving picture video signal from spiral track 28 will always be in synchronization with the field or frame rate of the video signal from video signal source 10.

In addition to the storage device of periodic reproducer 20 of FIG. 3 which has been described, FIG. 3 also shows the storage device for signal repeater 30. The storage device for signal repeater 30 is mounted on the underside of disc 40 and uses the lower magnetic surface 32 thereof. In this way, a single motor 17 and a single disc 40 can be used for both periodic reproducer 20 and signal repeater 30.

The storage device of signal repeater 30 seen in FIG. 3 includes a first transducer unit 36 and a second transducer unit 37. The magnetic heads of transducer units 36 and 37 are similar in design to that of transducer unit 24, and are capable of operating in conjunction with bottom magnetic surface 32 of disc 40. Transducer unit 36 is fixedly positioned at a selected radial distance near one end of diameter line 38 as seen in FIG. 5*b*. When disc 40 is rotated, the magnetic head of transducer unit 36 traverses a single circular track 39 on bottom surface 32, as seen in FIG. 5*b*. When a frame portion of the moving picture video signal is reproduced by transducer unit 24, and is applied to transducer unit by line 49, it will be recorded on circular track 39. Transducer unit 37 is fixedly positioned near the other end of diameter line 38 at a distance S therefrom. During rotation of disc 40, the magnetic head of transducer unit 37 will traverse the same circular track 39. Distance S is such that the video signal reproduced by transducer unit 36 is out of phase with the video signal reproduced by transducer unit 37. For this out of phase relationship, the video signal reproduced by transducer unit 37 is to be displaced an integer multiple of one-half horizontal interval from the video signal reproduced by transducer unit 36. When transducer unit 36 is at position $t_3$ within period 19*e* of FIG. 2*a* (as hereinafter described with reference to the playback timing signal of waveforms D and E of FIG. 9), then said integer multiple should be such that transducer unit 37 be within period 19*e'* of FIG. 2*b*. Accordingly, it will be realized that this integer multiple should preferably be as low as possible e.g. the number one.

Still picture timer 60 of FIG. 1 receives the output signal on line 58 of playback circuit 45 in order to produce playback timing signals on lines 59*a* and 59*b*. These playback timing signals are applied to playback switch 51 to allow the signals on lines 50*a* and 50*b* to alternately pass through playback switch 51. The output of playback switch 51 feeds into pre-amplifier 53 by line 52. When bridge switch 54 is closed (when not energized), then the output of pre-amplifier 53 is applied to playback circuit 45 through lines 55, 56, and 46. The playback timing signals of still picture timer 60 enable the frame portion signals on lines 50*a* and 50*b* to be combined into an output on line 52 of a continuous still picture video signal with the same picture information in each field thereof, and with the visual reproducing signals of the moving picture video signal.

Referring now to FIG. 6, there is seen therein a detailed block diagram of the still picture timer 60 shown in simplified block form in FIG. 1. As seen in FIG. 6, still picture timer 60 includes a sync stripper 61, a sync delay 62, a frame rate former 63, a reference circuit 64, a first timer 65, a second timer 66, and a counter 67. Line 58 connects to sync stripper 61 which connects to sync delay 62 by line 61' and also connects to frame rate former 63 by line 61''. Reference circuit 64 connects to frame rate former 63 by line 63', and connects to both first timer 65 and second timer 66 by line 64'. Sync delay 62 connects to counter 67 by line 62', and connects to reference circuit 64 by line 62''. Lines 59*a* and 59*b* are taken from the outputs of second timer 66 and first timer 65, respectively. Line 65' interconnects first timer 65 and second timer 66; line 67' also interconnects counter 67 and first timer 65. The signal on line 59*b* is applied to counter 67 by line 65''.

Still picture timer 60, as well as slow motion timer 80 of FIG. 1, utilize several monostable and bistable multivibrator circuits. FIG. 7*a* shows a basic form of a multivibrator circuit. Transistors $Q_1$ and $Q_2$ have their collectors connected to a negative voltage D.C. line through load resistors 70*a* and 70*b*, respectively. Both emitters are connected to ground. The collector of $Q_1$ is coupled by coupling network 71*a* to the base of transistor $Q_2$, and the collector of $Q_2$ is coupled by coupling network 71*b* to the base of transistor $Q_1$. Resistor 72*a* and resistor 72*b* connect a positive D.C. voltage to the base of transistor $Q_1$ and to the base of transistor $Q_2$ respectively, in order to provide bias therefor.

If coupling network 71*a* is capacitive, and coupling network 71*b* is resistive, and with $Q_1$ base resistor 72*a* connected to a high positive bias voltage, which normally keeps $Q_1$ collector current cut off (non-conducting), then the circuit is in a stable or so-called normal state. If a negative input trigger pulse is applied to the base of $Q_1$ via terminal 73*a* causing it to conduct, transistor $Q_2$ will be cut-off while the capacitance of coupling network 71*a* discharges through conducting transistor $Q_1$. The duration of this changed state of conduction is determined by essentially by the capacitance of coupling network 71*a* and resistor 72*b*, which is the time constant of this circuit. Thereafter, the multivibrator circuit will revert to its normal state. Accordingly, the circuit of FIG. 7*a* operates as a one shot or monostable multivibrator circuit which goes through a complete cycle of operation for each received trigger pulse, and then remains quiescent until another trigger pulse is received.

If both coupling networks 71*a* and 71*b* of FIG. 7*a* are resistive, a bistable multivibrator (flip-flop) circuit results. In this case, either transistor $Q_1$ or $Q_2$ conducts, while the other doesn't conduct. The state of conduction of this circuit is stable, and will remain so until changed by applied trigger pulses. A trigger pulse has to be applied to the base of one of the transistors $Q_1$ or $Q_2$ to change it from its non-conducting state to its conducting state, and thereby causing the other transistor to be non-conducting.

The circuit of FIG. 7*a* operating as a monostable multivibrator circuit can be caused to revert to its stable state prior to its normal period for doing so as determined by the time constant of the circuit. If during its changed state of conduction, a trigger pulse is applied to the base of transistor $Q_2$ via terminal 73*b* causing transistor $Q_2$ to be cut-off, the circuit will revert to its stable state at that time.

The output rectangular pulses of the circuit of FIG. 7*a* may be obtained from the collector of transistor $Q_2$ at terminal 74*b*, or an output of reverse polarity may be obtained from the collector of transistor $Q_1$ at terminal 74*a*. In order to form sharp trigger pulses from such rectangular pulses, a differentiating circuit of FIG. 7*b* may be used. The rectangular pulses are applied to terminal 75 which is differentiated by capacitor 76 and resistor 77 to provide sharp trigger pulses at output terminal 78. As a result, positive or negative directed sharp pulses or spikes will occur at the positive or negative directed edges of the rectangular pulses, respectively. On the other hand, if it is desired to apply input trigger pulses to the circuit of FIG. 7*a* at either the leading or trailing edges of rectangular pulses, then the differentiator circuit may be used to develop trigger pulses from the rectangular pulses at these edges.

Monostable and bistable multivibrator circuits of the type indicated by the basic circuit of FIG. 7*a*, designed for the particular waveforms involved, are utilized in the hereinafter described still picture timer 60 and slow motion timer 80 of FIG. 1. As is well known in the electronic art, such designs may include the use of positive as well as negative trigger pulses for either collector, base, or emitter triggered transistor multivibrator circuits. Differentiators of the type indicated by FIG. 7*b* are also utilized in conjunction with such multivibrator circuits.

Sync stripper 61 of FIG. 6 is a circuit that receives the video signal on line 58 and separates the sync pulses sync pulses, and the equalizing pulses. These sync pulses include the horizontal sync pulses, the serrated vertical sync pulses, and the equalizing pulses. These synch pulses are applied to sync delay 62 which includes a one shot or monostable multivibrator circuit to develop pulses that start at each of the leading edges of the pulses from sync stripper 61 and have a duration of about one-half horizontal sync interval.

Frame rate former 63 is a circuit that forms frame rate pulses seen as waveform A of FIG. 9 from every other serrated vertical sync pulse. These frame rate pulses occur at time $t_1$ seen in FIG. 2*a* during the vertical blanking period of the video signal on line 57. Frame rate former 63 includes a vertical sync pulse integrator circuit and a multivibrator circuit to develop every other occurring vertical sync pulse as shown in waveform A of FIG. 9.

Reference circuit 64 receives the frame rate pulses of waveform A of FIG. 9 to first develop the signal of waveform B of FIG. 9. The signal of waveform B is developed by a monostable multivibrator circuit to produce pulses, each of which is initiated by the frame rate pulses occurring at time $t_1$ seen in FIG. 2*a*, and is terminated within the same vertical blanking period at time $t_2$ seen in FIG. 2*a*. Reference circuit 64 also receives the pulses from sync delay 62 to produce pulses of waveform C of FIG. 9 appearing on line 64', each of which is initiated by the trailing edge of a pulse of waveform B and is terminated by the trailing edge of the next occurring pulse from sync delay 62. Reference circuit 64 includes another monostable multivibrator circuit that is triggered into its alternate conducting state of operation by trigger pulses derived from the trailing edges of the pulses of waveform B. This monostable multivibrator circuit is then triggered back to its original conducting state of operation by trigger pulses derived from the trailing edges of the next occurring pulses from sync delay 62, which occur at time $t_3$ seen in FIG. 2*a*. The trailing edges of the pulses of waveform C occur in between vertical sync pulses and their subsequent picture information, and also occur in between horizontal sync pulses.

As seen in FIG. 6, first timer 65 receives the reference signal of waveform C of FIG. 9 via line 64' to start each one of the series of playback timing signals seen in waveform D of FIG. 9. First timer 65 includes a monostable multivibrator circuit that is triggered on by trigger pulses derived from the trailing edges of waveform C of FIG. 9. The output of the monostable multivibrator circuit of first timer 65 is applied to counter 67 to start it to count the pulses from sync delay 62. After a predetermined number of pulses (e.g. 250 horizontal sync pulses) have been received by counter 67 from sync delay 62, counter 67 will become inactive. As a result, the output of counter 67 on line 67' is a rectangular pulse initiated by the leading edge of the output signal of the monostable multivibrator circuit of first timer 65, and which has a trailing edge at 250 horizontal sync pulses later. In other words, counter 67 is in effect a timed delay circuit, the duration of which is determined by a fixed number of horizontal sync pulses from sync delay 62. The trailing edges of the rectangular pulse of counter 67 is applied to first timer 65 to trigger it back to its original condition of operation. The output of first timer 65 on line **59*b*** is thereby formed and is seen as waveform D of FIG. 9.

It is to be noted that each of the leading edges of the pulses of waveform D of FIG. 9 occur at time $t_3$, in between horizontal sync pulses, during a vertical blanking period of one field of a television signal as seen in FIG. 2*a*. Counter 67 provides a delay interval equal to a fixed number of horizontal sync periods. The duration of the delay interval of counter 67 is such that each of the trailing edges of the pulses of waveform D of FIG. 9 occurs at a time prior to each of the vertical sync pulses of the next occurring alternate field of the video signal, and preferably occur at a time after all the picture information of said field. With counter 67 providing a delay interval of 250 horizontal sync periods later, as indicated, then each of the trailing edges of waveform D of FIG. 9 will occur in between pulses at time $t_4$ in the alternate field as seen in FIG. 2*b*. It will therefore be realized that the 250 horizontal sync delay interval of counter 67 can be varied a few horizontal sync intervals, as long as the leading and trailing edges of the pulses of waveform D of FIG. 9 occur at times to include the picture information of a video field, and occur prior to and after the vertical sync pulses as above described.

Second timer 66 also includes a monostable multivibrator circuit similar to first timer 65, but is designed to have an output of opposite polarity. In order to more effectively operate playback switch 51, it is preferable to apply switching signals thereto of opposite polarity. Accordingly, the monostable multivibrator circuit of second timer 66 is triggered to its alternate state of operation by the reverse output of first timer 65 received by line 65', and is triggered back to its original state of operation by the trailing edges of waveform C received by line 64'. The output of second timer 66 on line 59 is seen as waveform E of FIG. 9.

Suitable circuits for performing the functions of each of the indicated electronic circuitry referred to in FIGS. 1 and 6 are known in the art. Examples of such circuits are described and illustrated in a copending patent application of Kurt R. Machein, John T. Phan, and Arturo E. Stosberg, Ser. No. 543,915, filed Apr. 20, 1966, entitled "A Single Picture Reproducer," and assigned to the same assignee as this invention. In this copending patent application, an example of sync stripper 61 is shown in FIG. 4*a* thereof, an example of sync delay 62 is shown in FIG. 4*b* thereof, an example of frame rate former 63 is shown in FIG. 4*c* thereof, an example of reference circuit 64 is shown in FIG. 4*d* thereof, an example of a gating circuit that may be used in record driver 48 is shown in FIG. 4*h* thereof, an example of bridge switches 44 and 54 is shown in FIG. 4*k* thereof, an example of counter 67 is shown in FIG. 6*a* thereof, an example of first timer 65 is shown in FIG. 6*b* thereof, an example of second timer 66 is shown in FIG. 6*c* thereof, and an example of playback switch 51 is shown in FIG. 6*d* thereof.

The rectangular pulses of waveforms D and E of FIG. 9 are applied to slow motion timer 80 by lines **59*b'* and 59*a'*** respectively. As seen in FIG. 8*a*, slow motion timer 80 includes a slow motion counter 81, a delay multivibrator circuit 82, another delay multivibrator circuit 83, a bistable multivibrator or flip flop circuit 84, and inverter circuit 85.

FIG. 8*b* shows a schematic circuit diagram of a slow motion counter 81 that may be used in FIG. 8*a*. After rectangular pulses of waveform E of FIG. 9 are differentiated, the negative trigger pulses developed from the trailing edges thereof, which occur at the frame rate of the video signal, are applied by line **86*a* and coupling capacitor 86*b* to a flip flop circuit 87. In this case, flip flop circuit 87 is seen to be collector triggered and has a steering circuit including diodes 87*a* to enable pulses at a single input to make its two transistors 87*b* and 87*c* conduct alternately. The negative output pulses of flip flop circuit on line 87*d*, after being differentiated by capacitor 86*c* and resistor 86*d*, occur at half the rate of its input trigger pulses. Accordingly, flip-flop circuit 87** is designed to be used as a counter in which pulses at a single input make its two sides conduct alternately. An example of such a flip flop circuit may be seen in FIG. 7.15 on page 198 of the Transistor Manual published in 1964 by General Electric Company.

These negative pulses on line **86*e* are applied through steering diodes 88*a* in an identical flip flop circuit 88 with transistors 88*b* and 88*c*. The rectangular output pulses of flip flop circuit 87 and 88 are applied to diodes 89*a* and 89*b* to provide pulses on line 89*c* when both of these output pulses exist. The pulses on line 89*c* are slightly delayed by delay 89*d*, which is a monostable multivibrator circuit having a small period compared to that of a video field. The purpose of delay 89*d* is to provide pulses on line 89*e* which will not occur simultaneously with those of the input pulses to flip flop circuits 87 and 88. The output pulses on line 89*e* are differentiated by capacitor 89*f* and resistor 89*g* and by capacitor 89*f'* and resistor 89*g'*. Negative trigger pulses on the other side of diodes 89*h* and 89*h'*, which operate as reset pulses, are applied to the bases of transistors 87*c* and 88*c*. At the occurrence of these reset pulses, both flip flop circuits 87 and 88 will be reset or restored to their original operating conditions. The output pulses of flip flop circuits 87 and 88 applied to diodes 89*a* and 89*b* are both positive at every third trigger pulse applied to flip flop circuit 87**. Accordingly, the circuit of FIG.

8*b* operates to produce rate pulses on output line 89*i*, seen in waveform F of FIG. 9, which have an interval of three video frame periods, and which occur at the trailing edges of every third rectangular pulse of waveform E of FIG. 9. The rate pulses of waveform E of FIG. 9 form the slow motion rate signal in this described example.

Referring again to FIG. 8*a*, the rate pulses are applied as trigger pulses to delay circuits 82 and 83, both of which are monostable multivibrator circuits which are turned on by these rate pulses. The rectangular pulses of waveform E are applied to delay 82 which is designed so that trigger pulses derived from the second next occurring trailing edges of waveform E will trigger the multivibrator circuit of delay 82 back to its original operating condition. As a result, the rectangular pulses developed by delay 82 on line 80*c* form the actuating pulses of waveform G of FIG. 9. These actuating pulses are applied by line 80*c* to actuator 27*c* of periodic reproducer 20 seen in FIG. 3 and FIG. 4. The rectangular pulses of waveform D are applied to delay 83 which is designed so that trigger pulses derived from the second next occurring trailing edges of waveform D will trigger the multivibrator circuit of delay 83 back to its original operating condition. As a result, the rectangular pulses of delay 83 also start at the rate pulses of waveform of FIG. 8*a*, but terminate 275 horizontal sync intervals (i.e. 525 horizontal sync intervals of the standard television signal less 250 horizontal sync intervals of counter 67 of FIG. 6) prior to those of waveform G of FIG. 9. The trailing edges of the output waveforms of delay 82 and delay 83 are utilized to trigger flip flop circuit 84 to form the switch pulses, seen as waveform H of FIG. 9, which appear on line 80*b*. An inverter 85 develops a similar set of switch pulses, but of opposite polarity, which appear on line 80*a*.

In the described example, rate pulses with a duration of three video frame periods have been developed. These rate pulses form the slow motion rate signal which determines the rate at which periodic reproducer 20 periodically reproduces consecutive portions of its recorded moving picture video signal. For rate pulses of three video frame period intervals, the slow motion video signal developed by the system of this invention will have picture information of each video frame portion produced at one-third of the frame rate of the original moving picture signal. The system of this invention can operate to reduce the reproduction of the picture information of a moving picture video signal to any selected whole fraction of the frame rate thereof. If it is desired to have picture information of a moving picture video signal reproduced at one-half of the original frame rate, then rate pulses at one-half of the frame rate of the moving picture video signal will be developed by slow motion counter 81. For this purpose, only flip flop circuit 87 of FIG. 8*b* thereof needs to be utilized. If one-fourth the video frame rate is desired, the reset functions developed by diodes 89*a* and 89*b* and delay circuit 89*d* of FIG. 8*b* will not be used, and the rate pulses of one-fourth the video frame rate will be derived from the output of flip flop circuit 88. By varying the division fraction, a slow motion counter 81 of any suitable design can be used to select any integer multiple of the video frame rate, and result in having the system of this invention produce a slow motion video signal with a changed speed at a corresponding fraction thereof. It will be realized that if slow motion counter 81 is triggered by pulses occurring at the video field rate instead of the video frame rate, the rate pulses developed by slow motion counter 81 will then be an integer multiple of the video field rate.

It will be noted that the switching operations of bridge switches 44 and 54 and playback switch 51 occur at the leading and trailing edges of the playback timing signal of waveform D of FIG. 9. In order to eliminate switching transients resulting from such switching operations, a clamp generator 90 may be connected to line 59*b* to produce clamp blanking pulses at the leading and trailing edges of said playback timing signal. The clamp blanking pulses of clamp generator 90 will then be applied to playback circuit 45 to eliminate switching transients occurring at these times. In addition, magnetic erase heads or transducers are preferably provided to erase the tracks prior to recording thereon.

In the operation of the described embodiment of this invention shown in FIG. 1, video signal source 10 produces a moving picture video signal. When switch 14 is closed, the moving picture video signal passes through record circuit 12 to be applied to transducer unit 24 of periodic reproducer 20. With clutch means 27 engaged and with motor 17 rotating drive shafts 21 and 31, transducer unit 24 will move along rotating rod 26 to record the moving picture video signal on spiral track 28 seen in FIG. 5*a*. Then, switch 14 is opened, and transducer unit 24 is returned to its start position to enable it to retrace spiral track 28. Periodic reproducer 20 is now ready for reproducing consecutive portions of its recorded moving picture video signal in order to enable a slow motion video signal to be formed.

The continuous frames of a still picture video signal are developed by the single picture reproducer included in FIG. 1. This single picture reproducer comprises signal repeater 30, still picture timer 60, and playback switch 51. Signal repeater 30 receives the portion of the moving picture signal reproduced by periodic reproducer 20 and records it on its circular track 39 seen in FIG. 5*b*. The recorded portion of the moving picture signal on circular track 39 is repetitively reproduced by signal repeater 30 to alternately appear on lines 50*a* and 50*b* respectively. During each video frame, signal repeater 30 reproduces its recorded signal at the video field rate to appear once on line 50*a* and then once on line 50*b*. Still picture timer 60 receives the video output signal on line 57 from playback circuit 45 and produces playback timing signals on lines 59*b* and 59*a* seen as waveforms D and E of FIG. 9, respectively. In response to the playback timing signals on lines 59*a* and 59*b*, playback switch 51 will combine the portions of the video signal on lines 50*a* and 50*b* to form a still picture video signal at its output on line 52. This still picture video signal on line 52 has the same picture information in each field of its continuous frames, and has the visual reproducing signal (i.e. the sync, blanking, etc. pulses) of the moving picture video signal.

The playback timing signal of waveform E is also applied to slow motion timer 80 to produce actuating pulses of waveform G on line 80*c*, which are applied to actuator 27*c* of periodic reproducer 20. At the start of each actuating pulse, actuator 27*c*, being energized thereby, will move driven member 27*b* close to driver member 27*a* so that one of the pins 27*a'* of driver member 27*a* will thereafter engage pin 27*b'* of driven member 27*b*. At the end of each actuating pulse, actuator 27*c* will then not be energized, and driven member 27*b* will slide back to its original position so that none of the pins are engaged. Disengagement of the pins of driver member 27*a* and driven member 27*b* occur at the trailing edges of the actuating pulses of waveform G of FIG. 9. It will be noted that the pins of driver member 27*a* are spaced to be two frame periods apart, i.e. one of its pins will move to the position of the next pin in a period of two video frames. Since the pulses of waveform G of FIG. 9 have a duration of two video frames, pin 27*b'* of driven member 27*b* will engage a pin 27*a'* of driver member 27*a* one frame period prior to their disengagement. Driven member 27*b* will therefore be turned by driver member 27*a* for one video frame period every three video frame periods. Accordingly, for the described example, the system of this invention will then reproduce consecutive video frames of the recorded moving picture video signal at a rate equal to every third video frame period.

However, only selected portions of the moving picture video signal, as previously described, are necessary for producing a still picture video signal. These portions occur during the longer intervals of time shown by the rectangular pulses of waveforms D and E of FIG. 9. For this reason, switch pulses of waveform H are also developed by slow motion timer 80 so that periodic reproducer 20 will intermittently reproduce these selected portions of the recorded moving picture video signal. In this example, slow motion timer 80 develops each one of these switch pulses during the end of each actuating pulse of waveform G. These switching pulses of waveform H occur at the same rate as those of the rate pulses of waveform G of FIG. 9. These switching pulses on line 80*a* are applied to record driver 48 via line 48*a* allowing it to pass a signal therethrough. The switching pulses on line 80*a*, and pulses of opposite polarity thereto appearing on line 80*b*, are also applied to close bridge switch 44 and to open bridge switch 54. Accordingly, the portion of the moving picture video signal being reproduced by periodic reproducer 20 is then applied to signal repeater 30 to be re-recorded on its circular track 39, and is also applied to playback circuit 45.

The transducer unit 24 of periodic reproducer 20 will then continue to scan spiral track 28 on disc 40. Periodic reproducer 20 will intermittently reproduce consecutive portions of the recorded moving picture video signal therein. The slow motion rate signal developed by slow motion counter 81 of slow motion timer 80 will determine the periodic rate at which the portions of the moving picture video signal are produced by periodic reproducer 20. The single picture reproducer, comprising signal repeater 30, still picture timer 60, and playback switch 51, will receive each of the portions of the moving picture signal and develop therefrom continuous frames of a still picture video signal. The switch pulses of waveform H of FIG. 9 enable these video signals to be combined in the embodiment of FIG. 1 to have the output of playback circuit 45 on line 57 develop a slow motion video signal at one-third of the frame rate of the original moving picture video signal.

If it is desired to have the consecutive portions of the reproduced moving picture video signal have the picture information of each field of the moving picture video signal, then a ratchet device 29 seen in dotted lines in FIGS. 3 and 4 may be added thereto. Each time rod 26 is turned, transducer unit 24 scans one turn of spiral track 28 on disc 40, and thereby reproduces a frame portion of the recorded signal with picture information in one field thereof. Ratchet device 29 is designed to turn back rod 26 about one-half the amount it is turned just after each time it is turned. With the speed ratio of shaft 21 with respect to rod 26 being 10:1, rod 26 (when rotating) will turn 36 degrees every time disc 40 makes one revolution. Ratchet device 29 will therefore be designed to turn rod 26 back 18 degrees prior to rod 26 being turned again another 36 degrees. Transducer unit 24 will then scan track portions having the picture information of every video field in consecutive frame portions. Accordingly, periodic reproducer 20 will then be operative to produce consecutive frame portions with the picture information of every field of the moving picture video signal.

Having herein described the invention, what is claimed as new is:

1. A system for developing a slow motion video signal from a moving picture video signal with picture information and visual reproducing signals having sequential frames with alternate fields to form an interlacing picture in a television receiver, said system comprising:

a periodic reproducer, including a disc record member, for intermittently reproducing consecutive portions of a moving picture video signal recording on one side of said record member;

a slow motion timer connected to said periodic reproducer to determine the periodic rate and intervals at and during which said periodic reproducer reproduces the portions of the moving picture video signal; and a single picture reproducer connected to said periodic reproducer to receive and to record each of said portions of the moving picture video signal during each of said periodic intervals upon the other side of said record member, and to form therefrom a still picture video signal, consecutive still picture video signals combining to form said slow motion video signal.

2. The system defined in claim 1 wherein said single picture reproducer includes a signal repeater for repetitively reproducing each of said consecutive portions of the moving picture video signal at the field rate thereof, a playback switch connected to the signal repeater to receive its reproduced signals, and a still picture timer to develop playback timing signals and being connected the the playback switch to alternately combine the reproduced signals of the signal repeater to form continuous frames of the still picture video signal.

3. A system for developing a slow motion video signal from a moving picture video signal with picture information and visual reproducing signals forming sequential frames with alternate fields, said system comprising:

a periodic reproducer, including a disc record member, for intermittently reproducing consecutive portions of a moving picture video signal recorded on one side of said record member;

a slow motion timer connected to said periodic reproducer to control the periodic rate at which said periodic reproducer reproduces the portions of the moving picture video signal to occur at a selected integer multiple interval of the moving picture video frame rate; and a single picture reproducer connected to said periodic reproducer to receive and to record each of said portions of the moving picture video signal upon the other side of said record member, and to form therefrom continous frames of a still picture video signal during each of said periodic intervals, said still picture video signal having the visual reproducing signals of the moving picture video signal, and having in each field thereof the picture information of one field in the portion of the moving picture video signal, and said consecutively formed still picture video signals of the single picture reproducer enable a slow motion video signal to be developed.

4. The system defined in claim 3 wherein said single picture reproducer includes a signal repeater for repetitively reproducing each of said consecutive portions of the moving picture video signal at the field rate thereof, a playback switch connected to the signal repeater to receive its reproduced signals, and a still picture timer to develop playback timing signals and being connected to the playback switch to alternately combine the reproduced signals of the signal repeater to form continuous frames of the still picture video signal.

5. A system for developing a slow motion video signal from a moving picture video signal with picture information and visual reproducing signals forming sequential frames with alternate fields, said system comprising:

a periodic reproducer, including a disc record member, for periodically reproducing consecutive portions of a moving picture video signal recorded on one side of said record member;

a single picture reproducer connected to said periodic reproducer to receive and to record each of said portions of the moving picture video signal upon the other side of said record member, and to form therefrom continuous frames of a still picture video signal; and a slow motion timer connected to said periodic reproducer and to said single picture reproducer to control the periodic rate at which said periodic reproducer reproduces the portions of the moving picture video signal, whereby the consecutively formed still picture video signals of the single picture reproducer enable a slow motion video signal to be formed.

6. The system defined in claim 5 wherein said single picture reproducer includes a signal repeater for repetitively reproducing each of said consecutive portions of the moving picture video signal at the field rate thereof, a playback switch connected to the signal repeater to receive its reproduced signals, and a still picture timer to develop playback timing signals and being connected to the playback switch to alternately combine the reproduced signals of the signal repeater to form continuous frames of the still picture video signal.

7. A system for developing a slow motion video signal from a moving picture video signal with picture information and visual reproducing signals forming sequential frames with alternate fields, said system comprising:

a periodic reproducer, including a disc record member, for periodically reproducing consecutive portions of a moving picture video signal recorded on one side of said record members;

a single picture reproducer connected to said periodic reproducer to receive and to record each of said portions of the moving picture video signal upon the other side of said record member, and to form therefrom a still picture video signal, said still picture video signal having the visual reproducing signals of the moving picture video signal, and having the same picture information in each field thereof; and a slow motion timer connected to said periodic reproducer and to said single picture reproducer to control the periodic rate at which said periodic reproducer reproduces the portions of the moving picture video signal, whereby the consecutively formed still picture video signals of the signal picture reproducer enable a slow motion video signal to be developed.

8. The system defined in claim 7 wherein said single picture reproducer includes a signal repeater for repetitively reproducing each of said consecutive portions of the moving picture video singal at the field rate thereof, a playback switch connected to the signal repeater to receive its reproduced signals, and a still picture timer to develop playback timing signals and being connected to the playback switch to alternately combine the reproduced signals of the signal repeater to form continuous frames of the still picture video signal.

9. A system for developing a slow motion video signal from a moving picture video signal with picture information and visual reproducing signals forming sequential frames with alternate fields, said system comprising:

a periodic reproducer, including a rotating disc record member, for periodically reproducing consecutive frames of a moving picture video signal recorded upon one said of said record member;

a single picture reproducer connected to said periodic reproducer to receive and record each of said frames of the moving picture video signal upon the other side of said record member, and to form therefrom by repeated reproduction of a single field a continuous still picture video signal; and a slow motion timer connected to said periodic reproducer and to said single picture reproducer to control the periodic rate at which the periodic reproducer reproduces said frames of the moving picture video signal to occur at the moving picture video frame rate, whereby the consecutively formed still picture video signals of the single picture reproducer enable a slow motion video signal to be developed.

10. The system defined in claim 9 wherein said single picture reproducer includes a signal repeater for repetitively reproducing each of said consecutive portions of the moving picture video signal at the field rate thereof, a playback switch connected to the signal repeater to receive its reproduced signals, and a still picture timer to develop playback timing signals and being connected to the playback switch to alternately combine the reproduced signals of the signal repeater to form continuous frames of the still picture video signal.

11. A system for developing a slow motion video signal, from a moving picture signal, with picture information and visual reproducing signals forming sequential frames with alternate interlacing fields, said system comprising:

a periodic reproducer for intermittently reproducing consecutive portions of a recorded moving picture video signal;

a slow motion timer connected to said periodic reproducer to determine the periodic rate and interval at and during which said periodic reproducer reproduces said portions of the moving picture video signal; and a single picture reproducer connected to said periodic reproducer to receive each of said portions of the moving picture video signal during each of said periodic intervals and to form therefrom a still picture video signal, said single picture reproducer including a signal repeater for repetitively reproducing each of said consecutive portions of the moving picture video signal at the field rate thereof, a playback switch connected to said signal repeater to receive its reproduced signals, and a still picture timer connected to said playback switch to develop playback timing signals to alternately combine the reproduced signals of said signal repeater to form continuous frames of the still picture video signal, and said slow motion timer including a counter connected to said still picture timer to develop a slow motion rate signal therefrom and to said periodic reproducer to control its rate of reproduction in accordance with said slow motion rate signal.

12. The system defined in claim 11 wherein said periodic reproducer includes a magnetic storage device for recording a moving picture video signal on a spiral track therein, and clutch means for enabling the periodic reproducer to intermittently reproduce consecutive portions of the moving picture video signal.

13. A system for developing a slow motion video signal, from a moving picture video signal, with picture information and visual reproducing signals forming sequential frames with alternate interlacing fields, said system comprising:

a periodic reproducer for intermittently reproducing consecutive portions of a recorded moving picture video signal;

a slow motion timer connected to said periodic reproducer to control the periodic rate at which said periodic reproducer reproduces said portions of the moving picture video signal to occur at a selected integer multiple interval of the moving picture video frame rate; and a single picture reproducer connected to said periodic reproducer to receive each of said portions of the moving picture video signal and to form therefrom continuous frames of a still picture video signal during each of said periodic intervals, said still picture video signal having the visual reproducing signals of the moving picture video signal, and having in each field thereof the picture information of one field in the portion of the moving picture video signal, said consecutively formed still picture video signals of the single picture reproducer developing said slow motion video signal, said single picture reproducer including a signal repeater for repetitively reproducing each of said consecutive portions of the moving picture video signal at the field rate thereof, a playback switch connected to said signal repeater to receive its reproduced signals, and a still picture timer connected to said playback switch to develop playback timing signals and to alternately combine the reproduced signals of the signal repeater to form continuous frames of the still picture video signal, and said slow motion timer including a counter connected to said still picture timer to develop a slow motion rate signal therefrom and to said periodic reproducer to control its rate of reproduction in accordance with said slow motion rate signal.

14. The system defined in claim 13 in which said slow motion timer also develops switching signals and which additionally includes a switch means connected to receive the consecutive portions of the moving picture video signal of said periodic reproducer and the still picture video signals from said playback switch, said switch means being responsive to said switching signals and operative to develop the slow motion video signal.

15. A system for developing a slow motion video signal, from a moving picture video signal, with picture information and visual reproducing signals forming sequential frames with alternate fields, said system comprising:

a periodic reproducer for periodically reproducing consecutive portions of a recorded moving picture video signal;

a single picture reproducer connected to said periodic reproducer to receive each of said portions of the moving picture video signal and to form therefrom continuous frames of a still picture video signal; and a slow motion timer connected to said periodic reproducer and to said single picture reproducer to control the periodic rate at which said periodic reproducer reproduces the portions of the moving picture video signal, said single picture reproducer including a signal repeater for repetitively reproducing each of said consecutive portions of the moving picture video signal at the field rate thereof, a playback switch connected to said signal repeater to receive its reproduced signals, and a still picture timer connected to said playback switch to develop playback timing signals and to alternately combine the reproduced signals of the signal repeater to form continuous frames of said still picture video signal, and said slow motion timer including a counter connected to said still picture timer to develop a slow motion rate signal therefrom to said periodic reproducer to control its rate of reproduction in accordance with said slow motion rate signal, said slow motion video signal being formed of consecutive still picture video signals.

16. The system defined in claim 15 wherein said periodic reproducer includes a magnetic storage device for recording a moving picture video signal on a spiral track therein, and clutch means for enabling said periodic reproducer to intermittently reproduce consecutive portions of the moving picture video signal.

17. A system for developing a slow motion video signal from a moving picture video signal with picture information and visual reproducing signals forming sequential frames with alternate fields, said system comprising:

a periodic reproducer for periodically reproducing consecutive portions of a recorded moving picture video signal;

a single picture reproducer connected to said periodic reproducer to receive each of said portions of the moving picture video signal and to form therefrom a still picture video signal having the visual reproducing signals of the moving picture video signal and the same picture information in each field thereof; and a slow motion timer connected to said periodic reproducer and said single picture reproducer to control the periodic rate at which said periodic reproducer reproduces the portions of the moving picture video signal, said single picture reproducer including a signal repeater for repetitively reproducing each of said consecutive portions of the moving picture video signal at the field rate thereof, a playback switch connected to said signal repeater to receive its reproduced signals, and a still picture timer connected to the playback switch to develop playback timing signals and to alternately combine the reproduced signals of said signal repeater to form continuous frames of said still picture video signal, and said slow motion timer including a counter connected to said still picture timer to develop a slow motion rate signal therefrom to said periodic reproducer to control its rate of reproduction in accordance with said slow motion rate signal, said slow motion video signal being formed of consecutive still picture video signals.

18. The system defined in claim 17 in which said slow motion timer develops switching signals and which additionally includes a switch means connected to receive the consecutive portions of the moving picture video signal of said periodic reproducer the still picture video signals from the playback switch, said switching means being responsive to said switching signals and operative to develop the slow motion video signal.

19. A system for developing a slow motion video signal from a moving picture video signal with picture information and visual reproducing signals forming sequential frames with alternate fields, said system comprising:

a periodic reproducer for periodically reproducing consecutive portions of a recorded moving picture video signal;

a single picture reproducer connected to said periodic reproducer to receive each of said portions of the moving picture video signal and to form therefrom a continuous still picture video signal having the visual reproducing signals of the moving picture video signal, and having in each field thereof the picture information of one field in the portion of the moving picture video signal; and a slow motion timer connected to said periodic reproducer and to said single picture reproducer to control the periodic rate at which said periodic reproducer reproduces the portions of the moving picture video signal to occur at a selected integer multiple of the moving picture video frame rate, said single picture reproducer including a signal repeater for repetitively reproducing each of said consecutive portions of the moving picture video signal at the field rate thereof, a playback switch connected to said signal repeater to receive its reproduced signals, and a still picture timer connected to said playback switch to develop playback timing signals and to alternately combine the reproduced signals of said signal repeater to form continuous frames of said still picture video signal, and said slow motion timer including a counter connected to said still picture timer to develop a slow motion rate signal therefrom and to said periodic reproducer to control its rate of reproduction in accordance with the slow motion rate signal, said slow motion video signal being formed from consecutive still picture video signals.

20. The system defined in claim 19 wherein said periodic reproducer includes a magnetic storage device for recording a moving picture video signal on a spiral track therein, and clutch means for enabling the periodic reproducer to intermittently reproduce consecutive portions of the moving picture video signal.

References Cited

UNITED STATES PATENTS 3,051,777 8/1962 Lemelson.
3,395,248 7/1968 Suzuki.

ROBERT L. GRIFFIN, Primary Examiner
H. W. BRITTON, Assistant Examiner

U.S. Cl. X.R.

178—6, 69.5